US011801621B2

(12) United States Patent
Blom-Schieber et al.

(10) Patent No.: US 11,801,621 B2
(45) Date of Patent: Oct. 31, 2023

(54) SYSTEM AND METHOD FOR CURING THERMOSET COMPOSITES

(71) Applicant: The Boeing Company, Chicago, IL (US)

(72) Inventors: Adriana Willempje Blom-Schieber, Shoreline, WA (US); James Niemann Buttrick, Jr., Seattle, WA (US); Michael David Galuska, Kirkland, WA (US)

(73) Assignee: THE BOEING COMPANY, Arlington, VA (US)

( * ) Notice: Subject to any disclaimer, the term of this patent is extended or adjusted under 35 U.S.C. 154(b) by 347 days.

(21) Appl. No.: 16/888,027

(22) Filed: May 29, 2020

(65) Prior Publication Data

US 2021/0370554 A1 Dec. 2, 2021

(51) Int. Cl.
B29C 35/08 (2006.01)
B29C 35/02 (2006.01)
(Continued)

(52) U.S. Cl.
CPC ...... B29C 35/0805 (2013.01); B29C 35/0238 (2013.01); B29C 2035/0816 (2013.01); B29K 2101/10 (2013.01); B29K 2105/253 (2013.01)

(58) Field of Classification Search
CPC ..... B29C 2035/0811; B29C 2035/0816; B29C 33/06; B29C 35/02; B29C 35/0238;
(Continued)

(56) References Cited

U.S. PATENT DOCUMENTS 2,489,643 A * 11/1949 Hunter .................. B29C 70/882
425/389
5,107,095 A * 4/1992 Derbyshire ........... B29C 66/861
219/85.1
(Continued)

FOREIGN PATENT DOCUMENTS

DE 102016119940 A1 4/2018
EP 2457708 A1 5/2012
WO 2015/116175 A1 8/2015

OTHER PUBLICATIONS

Extended European Search Report dated Sep. 24, 2021 in corresponding European Application No. 21165929.7, 9 pages.
(Continued)

Primary Examiner — Philip C Tucker
Assistant Examiner — Jimmy R Smith, Jr.
(74) Attorney, Agent, or Firm — MH2 Technology Law Group LLP

(57) ABSTRACT

A system for curing a thermoset composite may include a tooling die configured to receive and support an uncured thermoset composite part and to heat the uncured thermoset composite part; a pressure media bag configured to be placed over the uncured thermoset composite part disposed on the tooling die and including a pressure media; and a mechanical press configured to apply a consolidation pressure to the uncured thermoset composite part disposed on the tooling die, the pressure media bag may be configured to distribute the consolidation pressure applied by the mechanical press to the uncured thermoset composite part disposed on the tooling die.

20 Claims, 8 Drawing Sheets

(51) Int. Cl.
  *B29K 101/10* (2006.01)
  *B29K 105/00* (2006.01)

(58) Field of Classification Search
  CPC ..... B29C 35/0805; B29C 43/10; B29C 70/44;
         B29C 70/544; B29C 35/0811; B29C
         35/0816; B29D 99/0014; B29K 2101/10;
         B29K 2105/253; B29K 2995/0008; B30B
         15/061; B30B 15/064
  USPC ........................................................ 156/242
  See application file for complete search history.

(56) References Cited

U.S. PATENT DOCUMENTS

| | | | |
|---|---|---|---|
| 5,131,834 A * | 7/1992 | Potter | B29C 70/44 |
| | | | 425/389 |
| 5,829,716 A * | 11/1998 | Kirkwood | B29C 66/30341 |
| | | | 244/119 |
| 6,180,932 B1 * | 1/2001 | Matsen | B23K 1/002 |
| | | | 219/615 |
| 6,566,635 B1 | 5/2003 | Matsen et al. | |
| 8,017,059 B2 | 9/2011 | Matsen et al. | |
| 8,330,086 B2 | 12/2012 | Miller et al. | |
| 8,372,327 B2 | 2/2013 | Matsen et al. | |
| 8,884,201 B2 | 11/2014 | Matsen et al. | |
| 9,174,398 B2 | 11/2015 | Miller et al. | |
| 9,259,886 B2 | 2/2016 | Matsen et al. | |
| 9,277,594 B2 | 3/2016 | Matsen et al. | |
| 9,314,975 B1 | 4/2016 | Matsen et al. | |
| 9,539,767 B2 | 1/2017 | Butler | |
| 9,662,742 B2 | 5/2017 | Matsen et al. | |
| 9,914,269 B2 | 3/2018 | Hopkins et al. | |
| 10,425,997 B2 | 9/2019 | Matsen et al. | |
| 10,464,240 B2 | 11/2019 | Matsen et al. | |
| 10,757,765 B2 | 8/2020 | Hull et al. | |
| 2005/0022922 A1 | 2/2005 | Banasky | |
| 2010/0181018 A1 * | 7/2010 | Walczyk | B29C 70/44 |
| | | | 156/243 |
| 2012/0145702 A1 | 6/2012 | Miller et al. | |
| 2012/0145703 A1 | 6/2012 | Matsen et al. | |
| 2013/0056139 A1 * | 3/2013 | Hermann | B22D 19/08 |
| | | | 156/242 |
| 2013/0082047 A1 | 4/2013 | Matsen et al. | |
| 2014/0231402 A1 | 8/2014 | Matsen et al. | |
| 2015/0048080 A1 | 2/2015 | Matsen et al. | |
| 2015/0158211 A1 | 6/2015 | Gensewich et al. | |
| 2016/0143092 A1 | 5/2016 | Miller et al. | |
| 2016/0157302 A1 | 6/2016 | Matsen et al. | |
| 2017/0246815 A1 | 8/2017 | Kestner et al. | |
| 2017/0246816 A1 | 8/2017 | Hopkins et al. | |
| 2020/0164547 A1 | 5/2020 | Voss et al. | |
| 2020/0164548 A1 | 5/2020 | Voss et al. | |
| 2020/0170080 A1 | 5/2020 | Voss et al. | |

OTHER PUBLICATIONS

Extended European Search Report dated Apr. 30, 2020 in related European Application No. 19211170.6, 8 pages.
Communication pursuant to Article 94(3) EPC dated Apr. 3, 2023 in corresponding European Application No. 21165929.7, 7 pages.

* cited by examiner

SYSTEM AND METHOD FOR CURING THERMOSET COMPOSITES

TECHNICAL FIELD

The present disclosure generally relates to the fabrication of thermoset composites, and more particularly, with systems and methods for the thermal and pressurized curing of thermoset composites.

BACKGROUND

Polymer composites are tough, light-weight materials created by combining two or more functional components, such as reinforcing fibers bound in polymer resin matrix. Fabrication of thermoset composite parts commonly requires the application of both pressure and heat to complete the curing and consolidation process. For example, different pressure and temperature profiles, i.e. variations as a function of time, may be used to process uncured thermoset composite parts or preforms.

Generally, curing of an uncured thermoset composite part is carried out in a pressurized autoclave where a heat source, such as resistive heating elements, supplies heat to the uncured thermoset composite part by convection before or while a consolidation pressure is applied. Production rate is significantly impacted by the time required to bring the autoclave up to temperature and to heat the uncured thermoset composite part before applying the consolidation pressure in the overall cure cycle time. In addition, use of an autoclave requires additional space and infrastructure, and may increase the productions costs for thermoset composite as the consumption of energy and consumables is higher when an autoclave is used.

Alternatives to autoclave curing of composites include oven curing or heated, matched-die curing. However, the pressure in oven curing is limited to vacuum, which is often not enough to remove all porosity; and oven curing still requires heating up tooling. Similarly, local variations in thickness can cause pressure differentials in matched-die tooling. For example, surfaces that are (near) perpendicular to the press direction in match die tooling often do not get sufficient pressure to properly cure the composite.

Accordingly, there is a need to reduce the cure cycle time of uncured thermoset composite parts by providing more efficient systems and methods for the processing of the uncured thermoset composite parts, system and methods that can efficiently apply heat and pressure to uncured thermoset composite parts, and in particular, systems and methods for curing thermoset composites that do not require an autoclave, allow for rapid heat-up of the tooling, and allow for a more uniform pressure to be applied to all surfaces of the uncured thermoset composite part during curing, including at pressures higher than 1 bar.

BRIEF SUMMARY

This summary is intended merely to introduce a simplified summary of some aspects of one or more implementations of the present disclosure. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing a system for curing a thermoset composite, including a tooling die configured to receive and support an uncured thermoset composite part and to heat the uncured thermoset composite part; a pressure media bag configured to be placed over the uncured thermoset composite part disposed on the tooling die and comprising a pressure media; and a mechanical press configured to apply a consolidation pressure to the uncured thermoset composite part disposed on the tooling die, wherein the pressure media bag is configured to distribute the consolidation pressure applied by the mechanical press to the uncured thermoset composite part disposed on the tooling die.

The tooling die may include a heating surface configured to contact at least a portion of the uncured thermoset composite part supported by the tooling die and heat at least a portion of the uncured thermoset composite part to a predetermined temperature.

The heating surface of the tooling die may include a smart susceptor, and wherein the smart susceptor may have a Curie temperature corresponding to the predetermined temperature.

The pressure media bag may include a heating surface configured to contact at least a portion of the uncured thermoset composite part and heat at least said portion of the uncured thermoset composite part to a predetermined temperature.

The heating surface of the pressure media bag may include a smart susceptor, and wherein the smart susceptor may have a Curie temperature corresponding to the predetermined temperature.

The pressure media bag may be configured to hold the pressure media, and wherein the pressure media bag includes a flexible material configured to withstand and distribute the consolidation pressure applied by the mechanical press.

The pressure media bag may include one or more vacuum ports, and the pressure media bag may be configured to serve as a vacuum bag when placed over the uncured thermoset composite part and the tooling die The pressure media may include a plurality of pressure media.

The pressure media may include an average particle size from about 0.5 mm to about 5 mm or less.

The pressure media may include thermally insulating materials.

The pressure media may include a gel-like medium.

The pressure media may include one or more of sand, glass, and ceramic materials.

The pressure media bag may include a flexible material configured to withstand and distribute the consolidation pressure applied by the mechanical press.

The pressure media bag may include one or more partitions, and wherein the one or more partitions may be configured to restrict movement of the pressure media to maintain the consolidation pressure within the one or more partitions.

The system may further include a compactor, wherein the compactor may include a shape corresponding to a shape of at least one of the tooling die and the uncured thermoset composite part, and wherein the compactor may be configured to distribute the consolidation pressure applied by the mechanical press to the pressure media bag and the uncured thermoset composite part.

The foregoing and/or other aspects and utilities embodied in the present disclosure may also be achieved by providing a method for curing a thermoset composite, including placing an uncured thermoset composite part on a tooling die;

placing a pressure media bag over the uncured thermoset composite part placed on the tooling die, the pressure media bag containing pressure media; heating the uncured thermoset composite part to a predetermined temperature; applying a consolidation pressure to the uncured thermoset composite part; and distributing the consolidation pressure applied to the uncured thermoset composite part disposed on the tooling die via the pressure media bag.

The method may further include placing a compactor over the pressure media bag, and wherein the compactor further distributes the consolidating pressure applied to the pressure media bag and the uncured thermoset composite part disposed on the tooling die.

At least one of the tooling die and the pressure media bag may include a heating surface, and the uncured thermoset composite part may be heated by at least one of the heating surface on the tooling die and the heating surface on the pressure media bag to the predetermined temperature.

At least one of the heating surface on the tooling die and the heating surface on the pressure media bag may include a smart susceptor, and wherein said smart susceptor may have a Curie temperature corresponding to the predetermined temperature.

The pressure media may include an average particle size from about 0.5 mm to about 5 mm, and wherein the pressure media comprises thermally insulating materials.

Further areas of applicability will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally, the same reference numbers will be used throughout the drawings to refer to the same or like parts.

An uncured thermoset composite part, also called a "preform," is generally cured by subjecting it to a combination of heat and pressure according to a predetermined cure schedule specifying applied pressures, temperatures, and durations for which the pressures and temperatures are maintained. These schedule temperatures and pressures are sometimes referred to as the curing temperature profile and the consolidation pressure profile.

As used herein the term "uncured thermoset composite part" or "preform" refers to one or more plies of composite materials impregnated with resin. For example, the uncured thermoset composite part may be a fiber-reinforced uncured thermoset polymer composite parts.

With respect to fiber-reinforced thermoset polymer composite parts, curing generally refers to the application of heat and/or pressure to crosslink and consolidate the fibers of a fiber-reinforced thermoset polymer composite part. While thermoset resins can be partially cured (i.e. crosslinked) without the application of pressure, it often results in a poorly consolidated part. Accordingly, as used herein, the terms "cure" and "curing" include both the application of heat (to cure/crosslink) and the application of pressure (to consolidate) fiber-reinforced thermoset polymer composite parts, such as the thermoset composite parts of the present disclosure.

In other examples, the uncured thermoset composite part may be a pre-preg. As used herein, the term "pre-preg" refers to pre-impregnated stacks of composite plies, such as epoxy impregnated unidirectional composite tape. A pre-preg may be flexible until it is cured, often by heat and pressure curing or curing within an autoclave.

Aspects of a system and method for curing thermoset composites requiring the application of both heat and pressure are described below. While the following description of the system and methods is made in relation to an uncured thermoset composite part, please note the present disclosure is not limited thereto. The system and method described below are applicable to other materials requiring the applications of heat and pressure to cure, such as, to cure adhesives for structural bonding and to consolidate thermoplastic fiber-reinforced composites.

Figure 1:
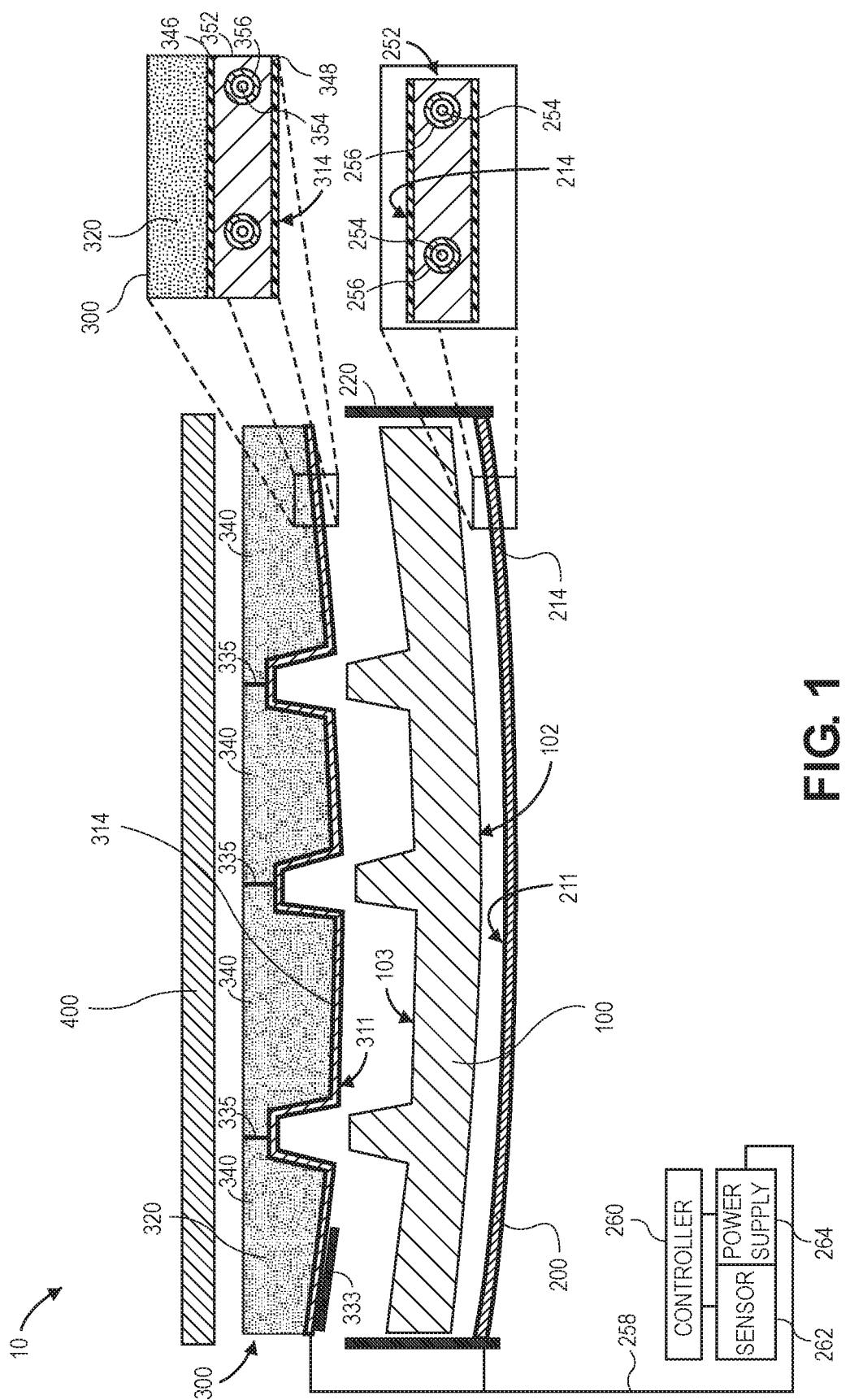
FIGS. 1-2 illustrate a system for curing thermoset composites according to an implementation of the present disclosure.
Figure 2:
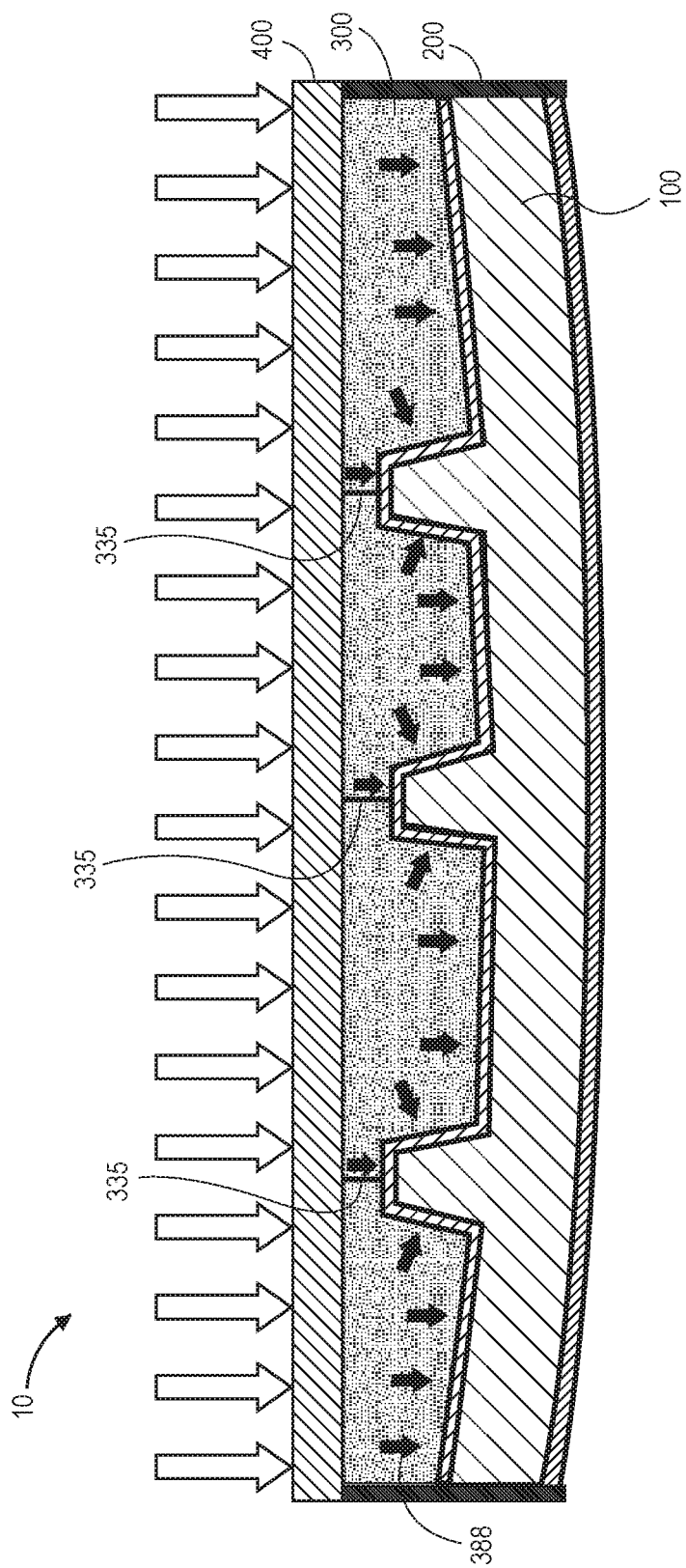
Figure 4:
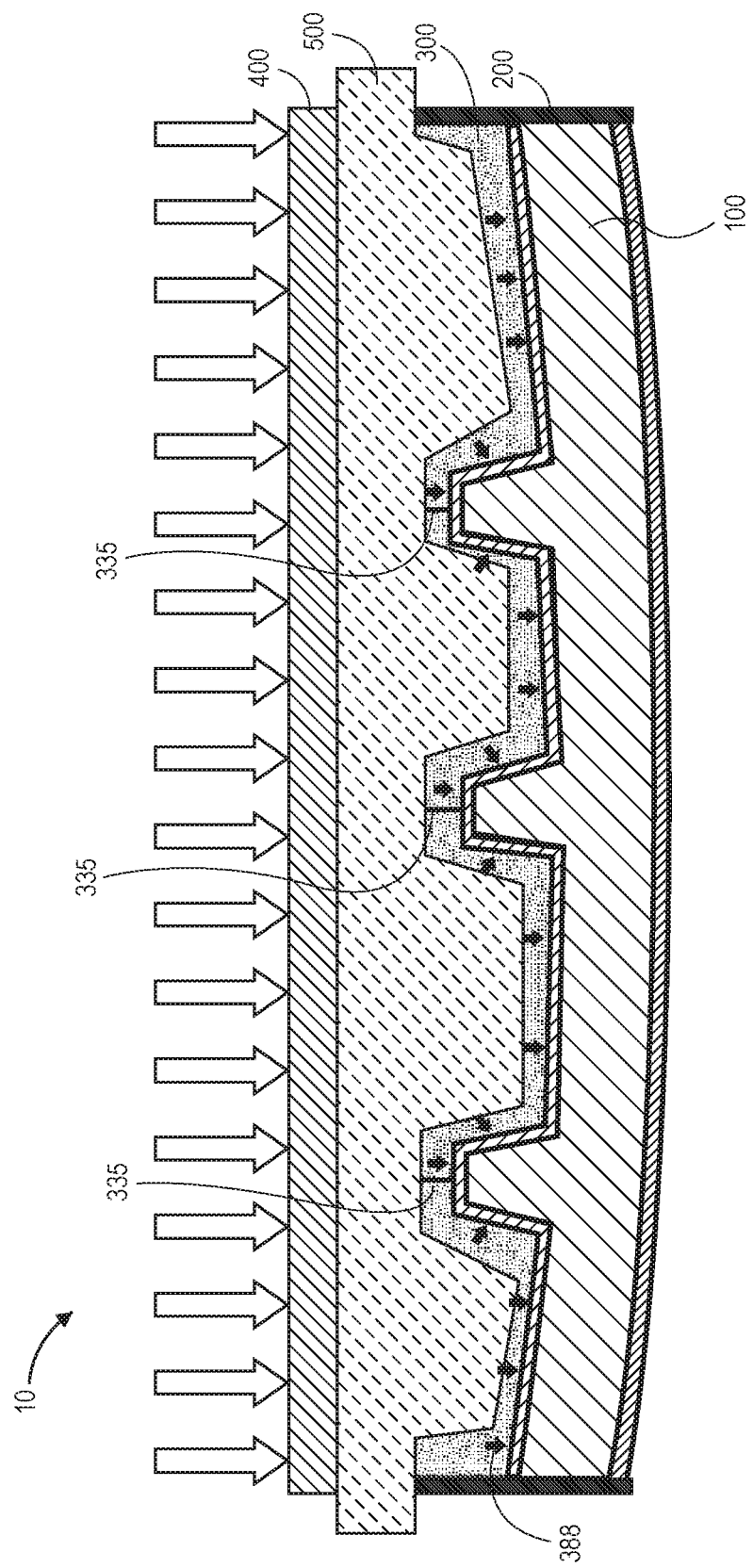
FIG. 4 illustrates a system for curing thermoset composites according to an implementation.

FIGS. 1-2 illustrate a system for curing a thermoset composite according to an implementation of the present disclosure. As illustrated in FIGS. 1-2, a system 10 for curing an uncured thermoset composite part 100 is shown to include a tooling die 200, a pressure media bag 300, and a mechanical press 400. The system 10 is shown to further include a controller 260, a sensor 262, and a power supply 264, although these components are not required to all implementations. Other implementations may include additional components. For example, FIG. 4 illustrates a system for curing thermoset composites according to another implementation. As illustrated in FIG. 4 and as discussed in greater detail below, in some implementations, the system 10 also includes a compactor 500.

The uncured thermoset composite part 100 may be a preform. The uncured thermoset composite part 100 may include an uncured fiber-reinforced thermoset polymer composite. For example, the uncured thermoset composite part 100 may include laminated plies of fiber reinforced polymer resin, such as, carbon fiber epoxy, or other thermosets that must be heated to a preselected temperature in order to effect curing.

In other implementations, the uncured thermoset composite part 100 includes interwoven wire fabrics (IWWF), fiber metal laminates, and/or honeycomb or foam cores surrounded by composite materials.

The tooling die 200 is configured to receive the uncured thermoset composite part 100. For example, the tooling die 200 may be configured to receive and support the uncured thermoset composite part 100 during a curing process. The tooling die 200 may include a receiving face 211 with a shape that substantially matches the shape of the uncured thermoset composite part 100. For example, the tooling die 200 includes a receiving face 211 having a shape that substantially matches a lower side 102 of the uncured thermoset composite part 100 to be cured.

In some implementations, the tooling die 200 is configured to receive and support the pressure media bag 300. For example, the tooling die 200 may include walls 220 configured to hold the pressure media bag 300 over the uncured thermoset composite part 100 in a constrained position to limit movement of the pressure media bag 300. In other implementations, the tooling die 200 is configured to seal against the pressure media bag 300 and the pressure media bag 300 is configured to act as a vacuum bag.

The tooling die 200 may be configured to heat the uncured thermoset composite part 100. The tooling die 200 may employ any of various heating techniques to generate the heat necessary to heat the uncured thermoset composite part 100 to a predetermined temperature, such as a curing temperature or temperature profile. For example, the tooling die 200 may include a heating surface 214 configured to heat the uncured thermoset composite part 100 to a predetermined temperature. The heating surface 214 may be disposed on the receiving face 211 and may cover at least a portion of the receiving face 211. In other implementations, the receiving face 211 includes the heating surface 214. The heating surface 214 may be configured to contact at least a portion of the uncured thermoset composite part 100 supported by the tooling die 200.

Figure 3:
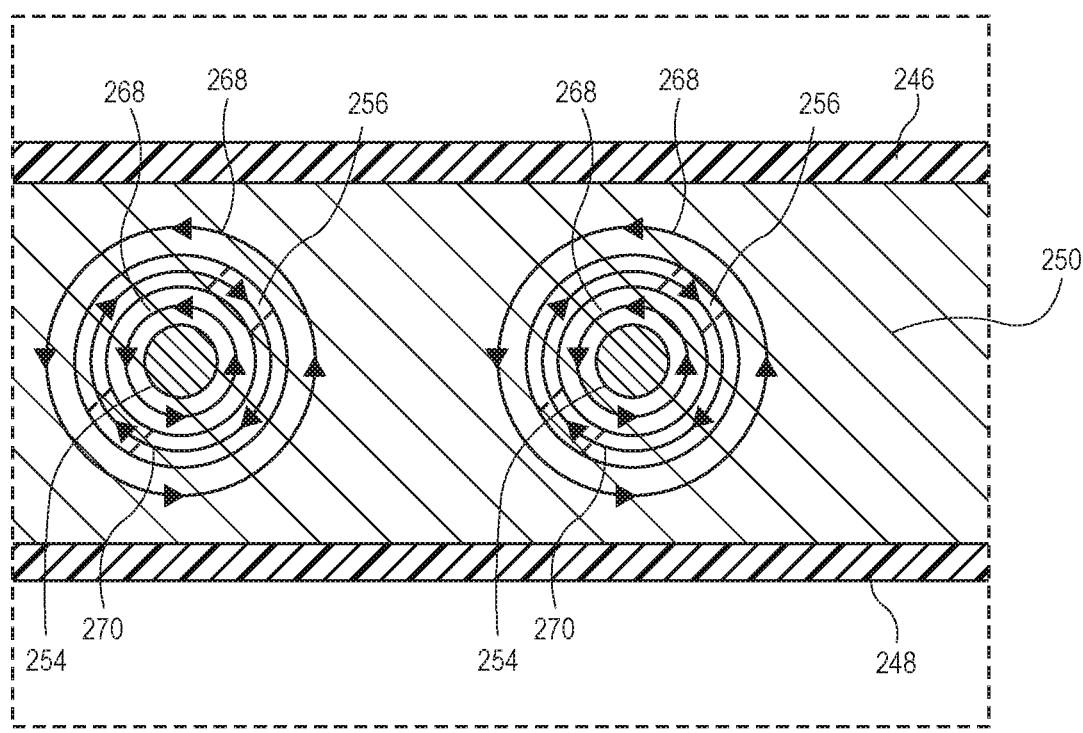
FIG. 3 illustrates inductive heating using smart susceptors according to an implementation.

The tooling die 200 may generate heat through electrical induction, and the generated heat may be transferred to at least a portion of the uncured thermoset composite part 100. For example, as illustrated in FIGS. 1-3, magnetic properties of magnetic materials are employed in combination with the application of high frequency alternating electrical power to generate heat. As described in more detail below, the tooling die 200 may include inductive heating and smart susceptors to heat the uncured thermoset composite part 100. For example, the heating surface 214 includes one or more inductive heating element 252 including an electrical conductor 254 and a surrounding smart susceptor sleeve 256, having a preselected Curie temperature, which are co-axially arranged. The heating surface 214 is configured to heat at least a portion of the uncured thermoset composite part 100 to a predetermined temperature, such as a curing temperature or temperature profile.

Accordingly, in one implementation, the tooling die 200 includes a heating surface 214 configured to contact the uncured thermoset composite part 100 and heat at least a portion of the uncured thermoset composite part 100 to the predetermined temperature. The heating surface 214 may include a smart susceptor, and the smart susceptor may have a Curie temperature corresponding to the predetermined temperature.

In one implementation, the predetermined temperature or temperature profile is from just above room temperature (80° F.) to about 820° F. The predetermined temperature or temperature profile may vary according to a composition of the uncured thermoset composite part 100 and/or the curing requirements for the resin or composite plies forming the uncured thermoset composite part 100. For example, the predetermined temperature or temperature profile can be from just above room temperature (80° F.) to about 350° F.

As illustrated in FIG. 3, the heating surface 214 includes upper and lower face sheets 246 and 248 having an interior filled with a thermally conductive material 250.

The upper and lower face sheets 246 and 248 may include a rigid layer of a suitable resin, such as epoxy or bis-maleimides (BMI), which encases one or more inductive heating elements 252. The rigid layer of resin may form the upper face sheet 246 of the heating surface 214 and may be configured to match a lower side 102 of the uncured thermoset composite part 100 disposed on the tooling die 200. In other implementations, other resins are employed to fabricate the upper and lower face sheets 246 and 248, including, but not limited to, polybenzoxazine (BXA). In some implementations, the heating surface 214 forms a permanent, non-flexible, shape that suits a particular application or uncured thermoset composite part 100. For example, the heating surface 214 and/or the upper and lower face sheets 246 and 248 may include metal.

As described above, an inductive heating element 252 may be embedded within the material 250. The inductive heating element 252 may include an electrical conductor 254 and a surrounding susceptor sleeve 256 which are co-axially arranged. The electrical conductor 254 may comprise, for example and without limitation, a Litz wire over which a spiral type susceptor is sleeved. The susceptor sleeve 256 may extend substantially the entire length of the electrical conductor 254. Axial spacing between the electrical conductor 254 and the susceptor sleeve 256 electrically insulates the susceptor sleeve 256 from the electrical conductor 254. The susceptor sleeve 256 is inductively heated by alternating electrical current flow through the electrical conductor 254. The inductively heated susceptor sleeve 256 conducts heat to the material 250, which in turn conducts heat through the heating surface 214 to the uncured thermoset composite part 100.

The material 250 may include ferromagnetic or superparamagnetic particles (not shown) to aid in heating the material 250. Where ferromagnetic particles are employed, the material 250 is heated by hysteretic heating of the ferromagnetic particles to a temperature that is substantially below the Curie temperature of the particles. Where superparamagnetic particles are incorporated into the material 250, the heat that is conducted through the material 250 is generated by relaxation heating of the superparamagnetic particles in correspondence to a Curie temperature range related to the size or diameter of the superparamagnetic particles.

As illustrated in FIG. 1, suitable wiring 258 connects the one or more heating elements 252 in the heating surface 214 to an alternating current power supply 264 that may be either a portable or fixed power supply. The power supply 264 is connected to a power source, such as for example and without limitation, a conventional 60 Hz, 110 volt or 220 volt outlet (not shown). The power supply 264 supplies alternating current to the electrical conductor 254, preferably in the range from approximately 1,000 Hz to approximately 300,000 Hz, although higher frequencies are possible. One or more thermal sensors 262 may be disposed on the heating surface 214 to monitor the temperature of the heating surface 214 in order to facilitate regulation of the magnitude or frequency of the alternating current supplied to the electrical conductor 254. The power supply 264 can be regulated by a suitable controller 260 based on the temperatures monitored by the thermal sensors 262.

As shown in FIGS. 1-3, the susceptor sleeve 256 is formed of a magnetic material having a Curie temperature. The susceptor sleeve 256 may be formed as a solid or unitary component in a cylindrical arrangement. The susceptor sleeve 256 may be implemented as a smart susceptor sleeve 256.

The flow of alternating current through the electrical conductor 254 results in the generation of a magnetic field 268 surrounding the susceptor sleeve 256. Eddy currents 270 are generated within the electrical conductor 254 as a result of exposure thereof to the magnetic field 268, and these eddy currents 270 cause the inductive heating of the susceptor sleeve 256. Heat from the susceptor sleeve 256 is then conducted through the material 250, and the heating surface 214 to the uncured thermoset composite part 100. The magnetic material from which the susceptor sleeve 256 is formed preferably has a high magnetic permeability and a Curie temperature that corresponds to the desired temperature to which the uncured thermoset composite part 100 is to be heated by the tooling die 200, i.e. the cure temperature of the uncured thermoset composite part 100. The susceptor sleeve 256 and the electrical conductor 254 are preferably sized and configured such that at temperatures below the Curie temperature of the susceptor sleeve 256, the magnetic field 268 is concentrated in the susceptor sleeve 256 due to its magnetic permeability.

Heating of the susceptor sleeve 256 continues during application of the alternating current until the magnetic material from which the susceptor sleeve 256 is formed of reaches the Curie temperature. Upon reaching the Curie temperature, the susceptor sleeve 256 becomes non-magnetic, at which point the magnetic fields 268 are no longer concentrated in the susceptor sleeve 256. The induced eddy currents 270 and associated resistive heating diminishes to a level sufficient to maintain the temperature of the susceptor sleeve 256 at the Curie temperature, consequently the uncured thermoset composite part 100 and/or the tooling die 200 remains heated to the desired cure temperature for the duration of the cure cycle, at which point the alternating current is removed from the conductor 254.

While some implementations use inductive heating in the tooling die 200, the present disclosure is not limited thereto and other heating methods may be used to heat the tooling die 200, such as resistive heating, forced air, heated oil, etc.

The pressure media bag 300 is configured to be placed over the uncured thermoset composite part 100 disposed on the tooling die 200 and includes a pressure media 320. The pressure media bag 300 includes a receiving face 311, and the pressure media bag is configured to substantially conform to a shape of the uncured thermoset composite part 100. For example, the pressure media bag 300 may substantially conform to an upper side 103 of the uncured thermoset composite part 100 to be cured.

The pressure media bag 300 is configured to distribute a consolidation pressure from the mechanical press 400 to the uncured thermoset composite part 100 disposed on the tooling die 200. As used herein, distribution of the consolidation pressure refers to ensuring that the consolidation pressure at all points of the uncured thermoset composite part 100 is substantially similar. That is, as illustrated in FIGS. 2 and 4, the consolidation pressure applied by the mechanical press 400 is evenly distributed by the pressure media bag 300, such that, a substantially similar amount of consolidation pressure is applied to all surfaces of the uncured thermoset composite part 100 in contact with the pressure media bag 300.

In contrast, in conventional methods in which a mechanical press is used to apply a consolidation pressure without a pressure media bag 300, the geometry of the tooling die or the mechanical press, may result in non-uniform application of the consolidation pressure. This is especially the case, when the thermoset composite part has a complex shape or contours. For example, as illustrated in FIGS. 2 and 4, the pressure media bag 300 enhances distribution of the pressure applied by the mechanical press 400 to surfaces perpendicular or at an angle to the mechanical press 400, as illustrated by arrows 388. Similarly, the pressure media bag 300 allows a substantially similar amount of consolidation pressure to be applied to the uncured thermoset composite part 100 in view of variability in the thickness of the uncured thermoset composite part 100 or mismatch between the geometry of the uncured thermoset composite part 100 and the mechanical press 400 that can otherwise create pressure hotspots or areas with a lack of pressure.

The pressure media bag 300 is configured to contain the pressure media 320.

The pressure media bag 300 may include a flexible material configured to withstand and distribute a consolidation pressure from the mechanical press 400 to the uncured thermoset composite part 100. The flexible material of the pressure media bag 300 may be compatible with the uncured thermoset composite part 100. For example, the pressure media bag 300 may include silicone, toughened rubber, polyurethane or other suitable elastomers that provide dimensional stability to the pressure media bag 300 while maintaining sufficient flexibility to allow distribution of the consolidation pressure by the pressure media 320.

The pressure media bag 300 may be implemented as one or more pressure media bags 300. The pressure media bag 300 may have an interior volume that is divided or partitioned. For example, in some implementations, the pressure media bag 300 includes one or more dividers 335 defining one or more partitions 340, and the one or more partitions 340 are configured to restrict a movement of at least one of the pressure media 320 to maintain and/or distribute the consolidation pressure within the one or more partitions 340. In some implementations, the one or more dividers 335 defining one or more partitions 340 are configured to maintain a shape of the pressure media bag 300.

In some implementations, the pressure media bag 300 includes one or more caul sheets 333. The caul sheets may be implemented as metal strips bonded to a surface of the pressure media bag 300 and configured to add or remove texture effects on the uncured thermoset composite part 100 during the curing process. In other implementations, the one or more caul sheets 333 are placed between the pressure media bag 300 and the uncured thermoset composite part 100. The one or more caul sheets 333 may be thermally conductive to easily pass on the heat from the tooling die 200 and/or the pressure media bag 300.

The pressure media 320 may include a plurality of pressure media 320. For example, the pressure media 320 may include at least one of solid particles, gel-like materials, and liquids.

The pressure media 320 may include a gel-like medium, such as a silicone gel. The pressure media 320 may include a liquid. The pressure media 320 may include a plurality of solid particles. For example, the pressure media 320 may include one or more of sand, glass, Styrofoam, silica aerogel, rubber, metal and ceramic particles. The pressure media 320 may have an average particle size from about 0.5 mm to about 5 mm. For example, the pressure media 320 may have an average particle size of about 4 mm or less, 3 mm or less, 2 mm or less, or 1 mm or less.

In some implementations, the pressure media 320 includes thermally insulating materials. For example, the pressure media 320 may be configured to thermally insulate the uncured thermoset composite part 100 to reduce an amount of heat loss. The pressure media 320 may have a thermal conductivity of 1 W/mK or less.

The pressure media bag 300 may be configured to heat the uncured thermoset composite part 100. The pressure media bag 300 may employ any of various heating techniques to generate the heat necessary to heat the uncured thermoset composite part 100 to a predetermined temperature, such as a curing temperature or temperature profile. For example, the pressure media bag 300 may include a heating surface 314 configured to heat the uncured thermoset composite part 100 to a predetermined temperature. In some implementations, the heating surface 314 contains the same elements and operate on the same principles as the heating surface 214 described above for the tooling die 200.

The heating surface 314 may be disposed on a receiving face 311 and may cover at least a portion of the receiving face 311. In other implementations, the receiving face 311 includes the heating surface 314. The heating surface 314 may be configured to contact at least a portion of the uncured thermoset composite part 100 supported by the tooling die 200, such as the upper side 103. Accordingly, the pressure media bag 300 may include a heating surface 314 configured to contact at least a portion of the uncured thermoset composite part 100 and heat at least said portion of the uncured thermoset composite part 100 to the predetermined temperature.

The pressure media bag 300 may generate heat through electrical induction, and the generated heat may be transferred to at least a portion of the uncured thermoset composite part 100. For example, the heating surface 314 may include a smart susceptor, and the smart susceptor may have a Curie temperature corresponding to the predetermined temperature.

As illustrated in FIGS. 1-3, the pressure media bag 300 includes inductive heating and smart susceptors to heat the uncured thermoset composite part 100. For example, the heating surface 314 includes one or more inductive heating element 352 including an electrical conductor 354 and a surrounding smart susceptor sleeve 356, having a preselected Curie temperature, which are co-axially arranged. The heating surface 314 includes upper and lower face sheets 346 and 348 having an interior filled with a thermally conductive material 350.

The heating surface 314 may be configured to heat at least a portion of the uncured thermoset composite part 100 to a predetermined temperature, such as a curing temperature or temperature profile.

The upper and lower face sheets 346 and 348 may be formed of a flexible, resilient material possessing a relatively high thermal conductivity and a relatively low electrical conductivity. For example, the upper and lower face sheets 346 and 348 may include silicone, rubber, polyurethane or other suitable elastomers that provide dimensional stability to the heating surface 314 while maintaining sufficient flexibility to allow the pressure media bag 300 to conform to at least a portion of the surface of the uncured thermoset composite part 100, including surfaces that are irregular or contoured. In one implementation, the material 350 includes an elastomer that is cast around an inductive heating element 352. The smart susceptor sleeve 356 may include a braided material in a sleeve configuration around the conductor 354 in order to enhance flexibility of the heating surface 314 and/or the pressure media bag 300.

As illustrated in FIG. 1, suitable wiring 258 connects the one or more heating elements 352 in the heating surface 314 to the power supply 264. One or more thermal sensors 262 may be disposed on the heating surface 314 to monitor the temperature of the heating surface 314 in order to facilitate regulation of the magnitude or frequency of the alternating current supplied to the conductor 354. The power supply 264 can be regulated by a suitable controller 260 based on the temperatures monitored by the thermal sensors 262.

In some implementations, the system 10 heats the uncured thermoset composite part 100 disposed on the tooling die 200 from both sides. For example, the system 10 may include both a heating surface 214 on the tooling die 200 and a heating surface 314 on the pressure media bag 300, and both heating surfaces 214 and 314 apply a heat to the uncured thermoset composite part 100. In other implementations, the system 10 heats the uncured thermoset composite part 100 disposed on the tooling die 200 from one side. For example, the system 10 includes only a heating surface 214 on the tooling die 200 or a heating surface 314 on the pressure media bag 300, and only one of the heating surfaces 214 and 314 applies a heat to the uncured thermoset composite part. In another example, the system 10 may include both a heating surface 214 on the tooling die 200 and a heating surface 314 on the pressure media bag 300, but only one of the heating surfaces 214 and 314 applies a heat to the uncured thermoset composite part 100.

Generally, a consolidation pressure is applied during the curing of an uncured thermoset composite part 100 to remove trapped air or volatiles produced by the cross-linking reaction of the thermoset resin. The consolidation pressure also helps ensure intimate contact of the reinforcing fibers and the resin within the final cured thermoset composite part.

Accordingly, in some implementations, the mechanical press 400 applies a predetermined pressure to the uncured thermoset composite part 100. For example, the mechanical press 400 is configured to apply a consolidation pressure to the pressure media bag 300 and the uncured thermoset composite part 100 disposed on the tooling die 200.

The mechanical press 400 is configured to apply a consolidation pressure to the uncured thermoset composite part 100 for a predetermined period. The predetermined period for the application of the consolidation pressure may start only after the uncured thermoset composite part 100 is heated to a predetermined temperature, such as a curing temperature. In other implementations, the predetermined period for the application of the consolidation pressure starts before the uncured thermoset composite part 100 is heated to a predetermined temperature. In some implementations, the consolidation pressure is increased or decreased as a function of time and temperature according to the temperature and pressure profiles.

In one implementation, the mechanical press 400 applies a consolidation pressure (or load) from about 1 to about 8 bar pressure. For example, the mechanical press 400 may apply a consolidation pressure up to about 8 bar, up to about 7 bar, up to about 6 bar, up to about 5 bar, up to about 4 bar, up to about 3 bar, up to about 2 bar, or up to about 1 bar.

As illustrated in FIG. 3, in some implementations, the system 10 further includes a compactor 500. The compactor 500 may have a shape corresponding to a shape of the tooling die 200 and/or the uncured thermoset composite part 100. The compactor 500 is configured to further distribute the consolidation pressure applied by the mechanical press 400 to the pressure media bag 300 and the uncured thermoset composite part 100.

The compactor 500 may be thermally insulating. That is, the compactor 500 may be configured to prevent loss of heat by the uncured thermoset composite part 100 during a curing operation. The compactor 500 may include typical tooling materials, such as steel, invar, and fiber-reinforced composites.

The system 10 may include a vacuum bag assembly 600 (not illustrated). In some implementations, the vacuum bag assembly 600 is installed over the uncured thermoset composite part 100 disposed on the tooling die 200. For example, the vacuum bag assembly 600 may include a bagging film to cover the uncured thermoset composite part 100 which may be sealed to an upper surface of the tooling die 200 and/or the uncured thermoset composite part 100 by means of sealant. In some implementations, a vacuum is drawn from the vacuum bag assembly 600 to apply a negative pressure and draw out volatiles and other gasses that may be generated as a result of the curing process of the uncured thermoset composite part 100. In other implementations, the vacuum bag assembly 600 is placed and sealed over the uncured thermoset composite part 100 to compact the uncured thermoset composite part 100 against the tooling die 200 during the curing process.

Figure 5:
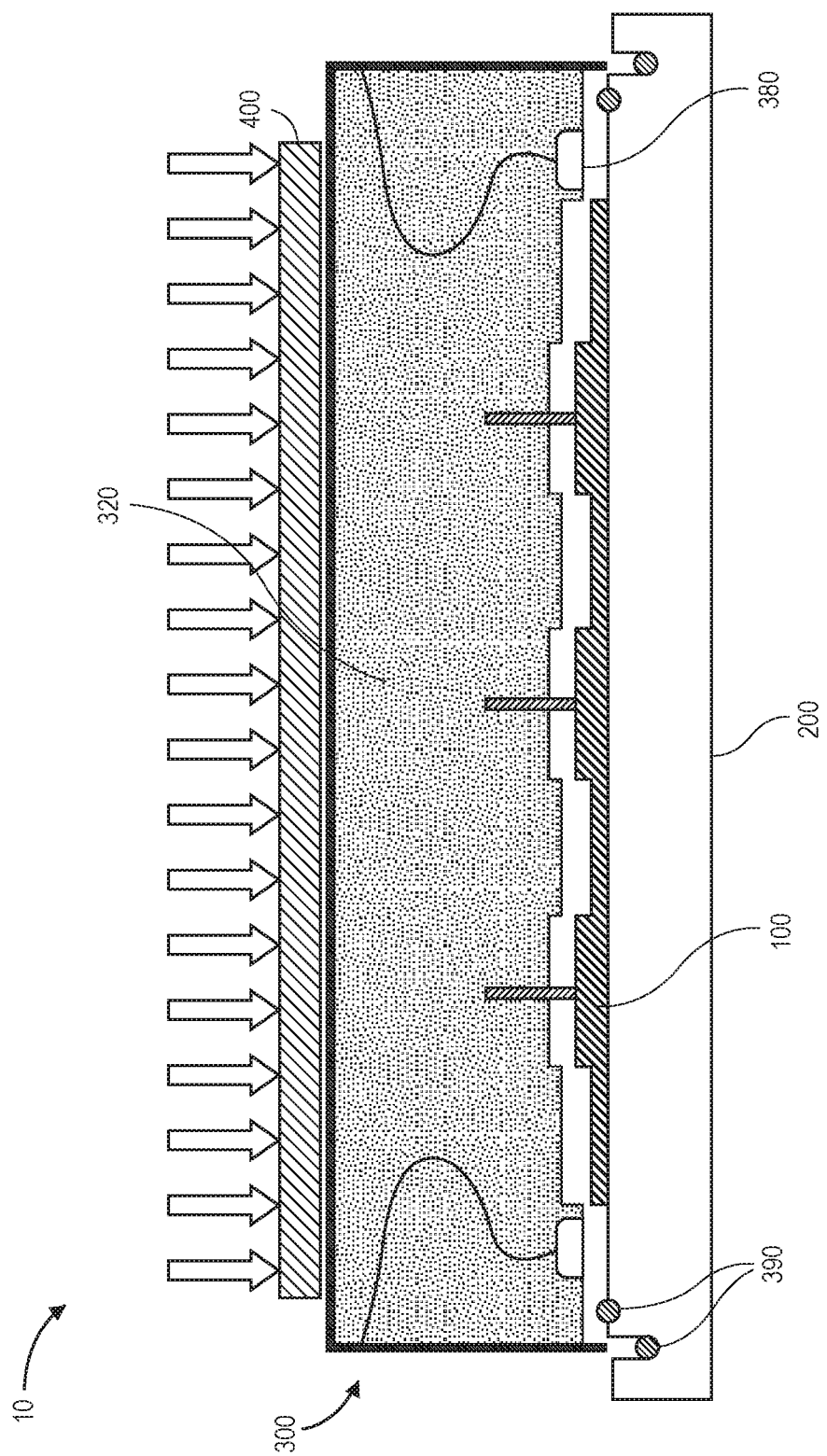
FIG. 5 illustrates a system for curing thermoset composites according to an implementation.

In other implementations, the pressure media bag 300 is configured to act as a vacuum bag. FIG. 5 illustrates a system for curing thermoset composites according to an implementation. As illustrated in FIG. 5, the system 10 includes one or more seals 380 configured to seal the pressure media bag 300 to the tooling die 200. The one or more seals 380 may be integrated on at least one of the pressure media bag 300 to the tooling die 200. For example, the one or more seals 380 may create an air-tight seal when the pressure media bag is disposed over the uncured thermoset composite part 100 and the tooling die 200. In some implementations, a pressure applied by the mechanical press 400 further enhances the air-tight seal created by the one or more seals 380.

As illustrated in FIG. 5, the pressure media bag includes one or more vacuum ports 390. The one or more vacuum ports 390 are configured to evacuate air when the pressure media bag is disposed over the uncured thermoset composite part 100 and the tooling die 200 and a negative pressure is drawn through the one or more vacuum ports 390. Accordingly, the pressure media bag 300 may include one or more vacuum ports 390, and the pressure media bag 300 may be configured to serve as a vacuum bag when placed over the uncured thermoset composite part 100 and the tooling die 200.

Figure 6:
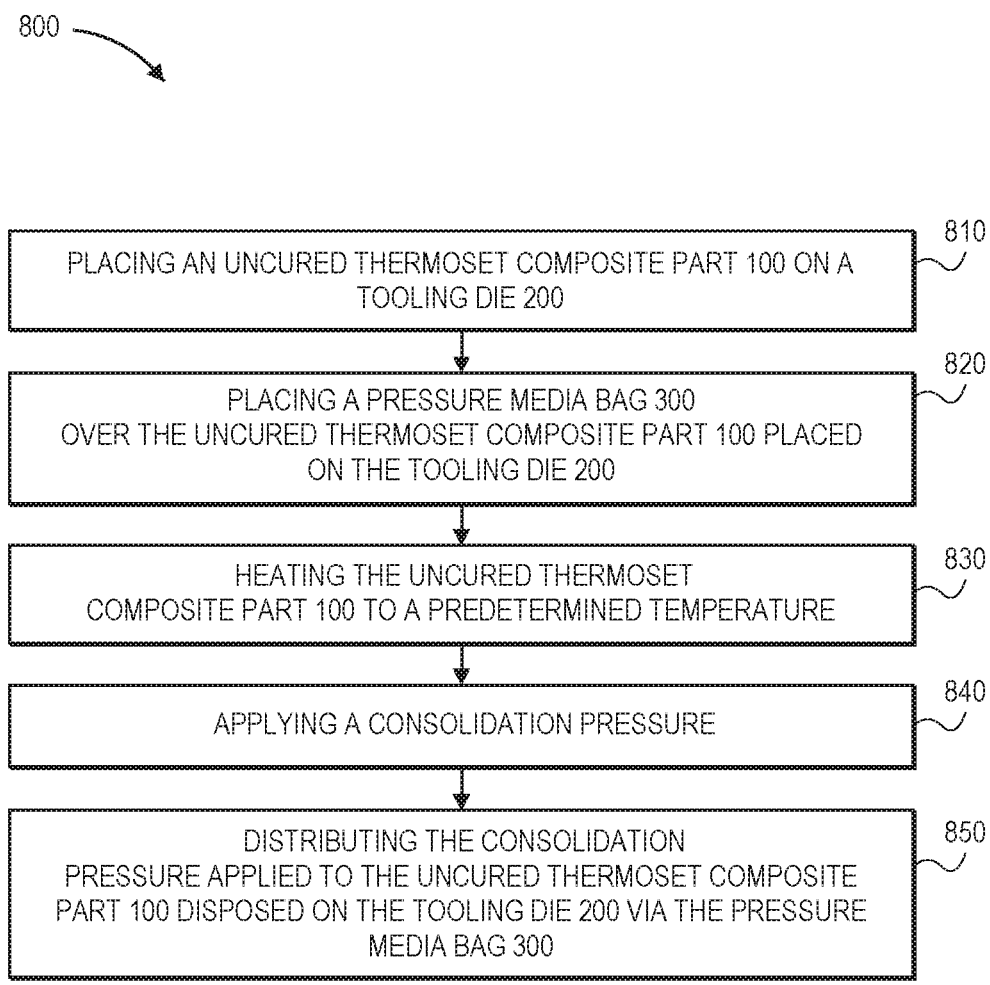
FIG. 6 illustrates a method for curing thermoset composite according to an implementation

FIG. 6 illustrates a method for curing a thermoset composite according to an implementation. FIG. 6 illustrates an example of a method that, for instance, could be used with the system 10 described above and as illustrated in FIG. 1-5. As such, the discussion below will reference various components as illustrated in FIG. 1-5.

As illustrated in FIG. 6, a method 800 for curing an uncured thermoset composite part 100 begins with placing an uncured thermoset composite part 100 on a tooling die 200 in operation 810. In some implementations, the tooling die 200 includes a heating surface 214, and at least a portion of the uncured thermoset composite part 100 is disposed over a heating surface 214 of the tooling die 200.

Operation 820 includes placing a pressure media bag 300 over the uncured thermoset composite part 100 placed on the tooling die 200. In some implementations, the pressure media bag 300 includes a heating surface 314, and at least a portion of the uncured thermoset composite part 100 is in contact with the heating surface 314 of the pressure media bag 300. In some implementations, a vacuum bag assembly 600 is placed over the uncured thermoset composite part 100 placed on the tooling die 200, and the pressure media bag 300 is placed over the vacuum bag assembly 600. Operation 820 may further include subjecting the uncured thermoset composite part 100 to a vacuum. For example, the pressure media bag 300 may include one or more vacuum ports 390, and the pressure media bag 300 may be configured to serve as a vacuum bag when placed over the uncured thermoset composite part 100 and the tooling die 200 and a negative pressure is drawn through the one or more vacuum ports 390.

Operation 830 includes heating the uncured thermoset composite part 100 to a predetermined temperature. The predetermined temperature may be a curing temperature corresponding to the composition of the uncured thermoset composite part 100. In other implementations, the predetermined temperature corresponds to a temperature along the curing temperature profile for the uncured thermoset composite part 100. The tooling die 200 may include a heating surface 214 and the pressure media bag 300 may include a heating surface 314, and the uncured thermoset composite part 100 may be heated by one or both of the heating surfaces 214 and 314 to the predetermined temperature. For example, at least one of the tooling die 200 and the pressure media bag 300 may include a heating surface (214 or 314), and the uncured thermoset composite part 100 may be heated by at least one of the heating surface 214 on the tooling die 200 and the heating surface 314 on the pressure media bag 300 to the predetermined temperature.

In some implementations, at least one of the heating surface 214 on the tooling die 200 and the heating surface 314 on the pressure media bag 300 includes a smart susceptor, and said smart susceptor may have a Curie temperature corresponding to the predetermined temperature.

Operation 840 includes applying a consolidation pressure to the uncured thermoset composite part 100. A mechanical consolidation pressure may be applied by the mechanical press 400. In some implementations, the consolidation pressure is applied once the uncured thermoset composite part 100 has reached the predetermined temperature. In other implementations, the consolidation pressure is applied before the uncured thermoset composite part 100 has reached the predetermined temperature.

Operation 850 includes distributing the consolidation pressure applied to the uncured thermoset composite part 100 disposed on the tooling die 200 via the pressure media bag 300. For example, the pressure media bag 300 may distribute the consolidating pressure applied to the uncured thermoset composite part 100 disposed on the tooling die 200. In one implementation, the pressure media bag 300 distributes the consolidating pressure applied by the mechanical press 400 to the uncured thermoset composite part 100 disposed on the tooling die 200.

The pressure media bag 300 is configured to hold the pressure media 320. The pressure media 320 may include an average particle size of about 1 mm or less, and the pressure media 320 may include thermally insulating materials.

In other implementations, the system 10 further includes a compactor 500. The method 800 further includes placing a compactor 500 over the pressure media bag 300, and the compactor 500 further distributes the consolidating pressure to the pressure media bag 300 and the uncured thermoset composite part 100 disposed on the tooling die 200. For example, the compactor 500 is configured to distribute the consolidating pressure applied by the mechanical press 400 to the pressure media bag 300 and the uncured thermoset composite part 100 disposed on the tooling die 200.

Figure 7:
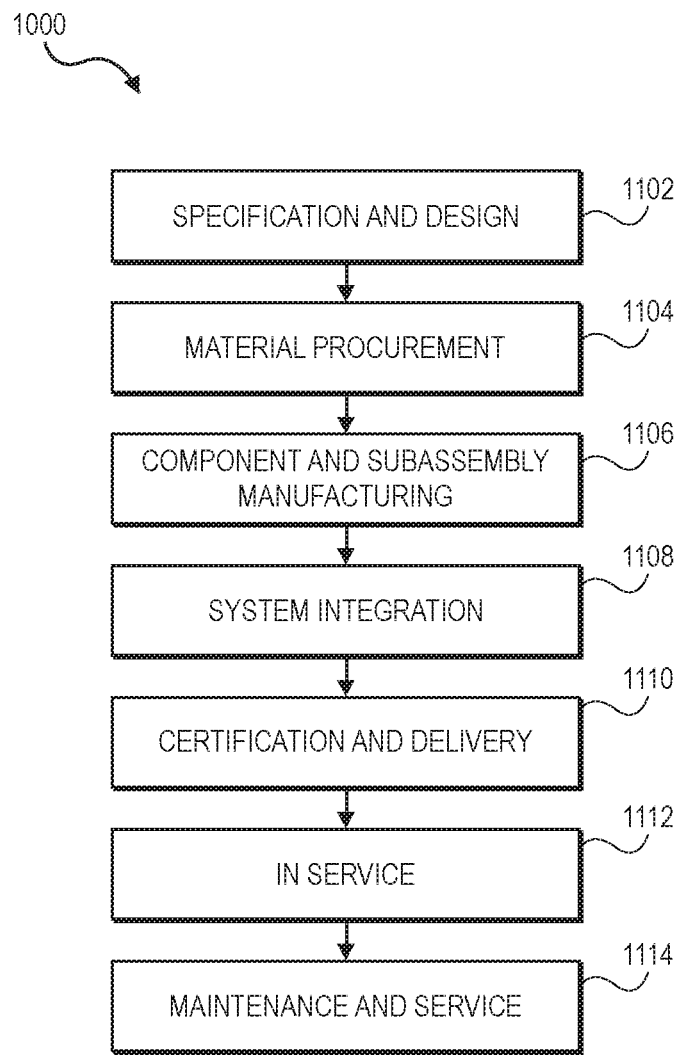
FIG. 7 illustrates a flow diagram of aircraft production and service methodology.
Figure 8:
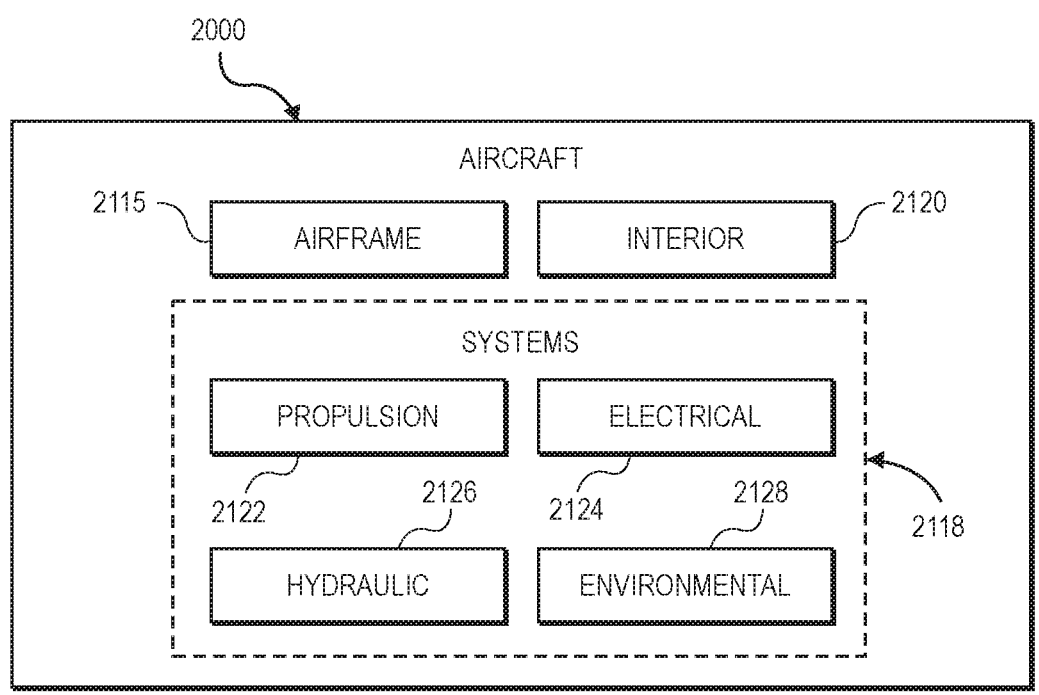
FIG. 8 illustrates a block diagram of an aircraft.

Implementations of the present disclosure may find use in a variety of potential applications, particularly in the transportation industry, including for example, aerospace, marine, automotive applications, and other application where thermal curing of thermoset composites is carried out. Thus, referring now to FIGS. 7 and 8, implementations of the disclosure may be used in the context of an aircraft manufacturing and service method 1000 as shown in FIG. 7 and an aircraft 2000 as shown in FIG. 8. During pre-production, exemplary method 1000 may include specification and design 1102 of the aircraft 2000 and material procurement 1104. During production, component and subassembly manufacturing 1106 and system integration 1108 of the aircraft 2000 takes place. Thereafter, the aircraft 2000 may go through certification and delivery 1110 in order to be placed in service 1112. While in service by a customer, the aircraft 2000 is scheduled for routine maintenance and service 1114, which may also include modification, reconfiguration, refurbishment, and so on.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 2000 produced by exemplary method 1000 may include an airframe 2115 with a plurality of systems 2118 and an interior 2120. Examples of systems 2118 include one or more of a propulsion system 2122, an electrical system 2124, a hydraulic system 2126, and an environmental system 2128. Any number of other systems may be included. Although an aerospace example is shown, the principles of the disclosure may be applied to other industries, such as the marine and automotive industries.

Systems and methods exemplified herein may be employed during any one or more of the stages of the aircraft manufacturing and service method 1000. For example, components or subassemblies corresponding to production process 1106 may be fabricated or manufactured in a manner similar to components or subassemblies produced while the aircraft 2000 is in service. Also, one or more apparatus examples, method examples, or a combination thereof may be utilized during the production stages 1106 and the 1108, for example, by substantially expediting assembly of or reducing the cost of an aircraft 2000. Similarly, one or more of apparatus examples, method examples, or a combination thereof may be utilized while the aircraft 2000 is in service, for example and without limitation, to maintenance and service 1114.

While FIGS. 7 and 8 describe the disclosure with respect to aircraft and aircraft manufacturing and servicing, the present disclosure is not limited thereto. The system and methods for curing thermoset composites of the present disclosure may also be used for spacecraft, satellites, submarines, surface ships, automobiles, tanks, trucks, power plants, and any other suitable type of objects.

Throughout the specification and claims, the following terms take the meanings explicitly associated herein, unless the context clearly dictates otherwise. Phrases, such as, "in an implementation," "in certain implementations," and "in some implementations" as used herein do not necessarily refer to the same implementation(s), though they may. Furthermore, the phrases "in another implementation" and "in some other implementations" as used herein do not necessarily refer to a different implementation, although they may. As described below, various implementations can be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes implementations containing A, B, or C, multiple examples of A, B, or C, or combinations of A/B, A/C, B/C, A/B/B/B/B/C, AB/C, etc. In addition, throughout the specification, the meaning of "a," "an," and "the" include plural references. The meaning of "in" includes "in" and "on." Similarly, implementations of the present disclosure may suitably comprise, consist of, or consist essentially of, the elements A, B, C, etc.

It will also be understood that, although the terms first, second, etc. can be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the invention. The first object, component, or step, and the second object, component, or step, are both, objects, component, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" can be construed to mean "when" or "upon" or "in response to determining" or "in response to detecting," depending on the context.

All physical properties that are defined hereinafter are measured at 20° to 25° Celsius unless otherwise specified.

When referring to any numerical range of values herein, such ranges are understood to include each and every number and/or fraction between the stated range minimum and maximum, as well as the endpoints. For example, a range of 0.5% to 6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Unless otherwise specified, all percentages and amounts expressed herein and elsewhere in the specification should be understood to refer to percentages by weight. The percentages and amounts given are based on the active weight of the material. For example, for an active ingredient provided as a solution, the amounts given are based on the amount of the active ingredient without the amount of solvent or may be determined by weight loss after evaporation of the solvent.

With regard to procedures, methods, techniques, and workflows that are in accordance with some implementations, some operations in the procedures, methods, techniques, and workflows disclosed herein can be combined and/or the order of some operations can be changed.

The present disclosure has been described with reference to exemplary implementations. Although a few implementations have been shown and described, it will be appreciated by those skilled in the art that changes may be made in these implementations without departing from the principles and spirit of preceding detailed description. It is intended that the present disclosure be construed as including all such modifications and alterations insofar as they come within the scope of the appended claims or the equivalents thereof.

The invention claimed is:

1. A system for curing a thermoset composite, comprising:
   a tooling die configured to receive and support an uncured thermoset composite part and comprising a heating surface configured to heat the uncured thermoset composite part;
   a pressure media bag configured to be placed over the uncured thermoset composite part disposed on the tooling die and comprising a pressure media; and
   a mechanical press configured to apply a consolidation pressure to the uncured thermoset composite part disposed on the tooling die,
   wherein the pressure media bag is configured to distribute the consolidation pressure applied by the mechanical press to the uncured thermoset composite part disposed on the tooling die,
   wherein the pressure media bag comprises a heating surface configured to contact at least a portion of the uncured thermoset composite part and heat at least said portion of the uncured thermoset composite part to a predetermined temperature,
   wherein the heating surface of the pressure media bag comprises a smart susceptor, and
   wherein the smart susceptor has a Curie temperature corresponding to the predetermined temperature.

2. The system of claim 1, wherein the heating surface is configured to contact at least a portion of the uncured thermoset composite part supported by the tooling die and heat at least said portion of the uncured thermoset composite part to the predetermined temperature.

3. The system of claim 2, wherein the heating surface of the tooling die comprises a smart susceptor, and wherein the smart susceptor has a Curie temperature corresponding to the predetermined temperature.

4. The system of claim 1, wherein the pressure media bag is configured to hold the pressure media, and
   wherein the pressure media bag comprises a flexible material configured to withstand and distribute the consolidation pressure applied by the mechanical press.

5. The system of claim 1, wherein the pressure media bag comprises one or more vacuum ports, and the pressure media bag is configured to serve as a vacuum bag when placed over the uncured thermoset composite part and the tooling die.

6. The system of claim 1, wherein the pressure media comprises a plurality of pressure media.

7. The system of claim 1, wherein the pressure media comprises an average particle size from about 0.5 mm to about 5 mm.

8. The system of claim 1, wherein the pressure media comprises thermally insulating materials.

9. The system of claim 1, wherein the pressure media comprises a gel.

10. The system of claim 1, wherein the pressure media comprises one or more of sand, glass, and ceramic materials.

11. The system of claim 1, wherein the pressure media bag comprises a flexible material configured to withstand and distribute the consolidation pressure applied by the mechanical press.

12. The system of claim 1, wherein the pressure media bag comprises one or more partitions, and
    wherein the one or more partitions are configured to restrict movement of the pressure media to maintain the consolidation pressure within the one or more partitions.

13. The system of claim 1, further comprising a compactor, wherein the compactor comprises a shape corresponding to a shape of at least one of the tooling die and the uncured thermoset composite part, and wherein the compactor is configured to distribute the consolidation pressure applied by the mechanical press to the pressure media bag and the uncured thermoset composite part.

14. A method for curing a thermoset composite, comprising:
    placing an uncured thermoset composite part on a tooling die comprising a heating surface configured to heat the uncured thermoset composite part;
    placing a pressure media bag over the uncured thermoset composite part placed on the tooling die, the pressure media bag containing pressure media;
    heating the uncured thermoset composite part to a predetermined temperature;
    applying a consolidation pressure, via a mechanical press, to the uncured thermoset composite part disposed on the tooling die; and
    distributing the consolidation pressure applied to the uncured thermoset composite part disposed on the tooling die via the pressure media bag,
    wherein the pressure media bag comprises a smart susceptor, and
    wherein said smart susceptor has a Curie temperature corresponding to the predetermined temperature.

15. The method of claim 14, wherein the method further comprises placing a compactor over the pressure media bag, and wherein the compactor further distributes the consolidating pressure applied to the pressure media bag and the uncured thermoset composite part disposed on the tooling die.

16. The method of claim 15, wherein the pressure media bag comprises a heating surface, and the uncured thermoset composite part is heated by at least one of the heating surface on the tooling die and the heating surface on the pressure media bag to the predetermined temperature.

17. The method of claim 16, wherein at least one of the heating surface on the tooling die and the heating surface on the pressure media bag comprises a smart susceptor, and wherein said smart susceptor has a Curie temperature corresponding to the predetermined temperature.

18. The method of claim 14, wherein the pressure media comprises an average particle size from about 0.5 mm to about 5 mm, and wherein the pressure media comprises thermally insulating materials.

19. A system for curing a thermoset composite, comprising:
- a tooling die configured to receive and support an uncured thermoset composite part and comprising a heating surface configured to heat the uncured thermoset composite part;
- a pressure media bag configured to be placed over the uncured thermoset composite part disposed on the tooling die and comprising a pressure media; and
- a mechanical press configured to apply a consolidation pressure to the uncured thermoset composite part disposed on the tooling die,
- wherein the pressure media bag is configured to distribute the consolidation pressure applied by the mechanical press to the uncured thermoset composite part disposed on the tooling die, and
- wherein the pressure media bag comprises a smart susceptor configured to heat at least a portion of the uncured thermoset composite part to a predetermined temperature.

20. The system of claim 19, wherein the smart susceptor has a Curie temperature corresponding to the predetermined temperature.

* * * * *